(12) United States Patent
Serbine et al.

(10) Patent No.: US 10,525,887 B2
(45) Date of Patent: Jan. 7, 2020

(54) ARRANGEMENT OF AN EXTERIOR MIRROR ON A VEHICLE DOOR OF A MOTOR VEHICLE

(71) Applicant: Dr. Ing. h.c. F. Porsche Aktiengesellschaft, Stuttgart (DE)

(72) Inventors: Thorsten Serbine, Stuttgart (DE); Michael Stoeckle, Muehlacker (DE); Andreas Kohler, Bad Liebenzell (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 15/800,514

(22) Filed: Nov. 1, 2017

(65) Prior Publication Data

US 2018/0126909 A1   May 10, 2018

(30) Foreign Application Priority Data

Nov. 7, 2016   (DE) .......................... 10 2016 121 141

(51) Int. Cl.
*B60R 1/06* (2006.01)
*B60J 5/04* (2006.01)

(52) U.S. Cl.
CPC ............... *B60R 1/06* (2013.01); *B60J 5/0404* (2013.01)

(58) Field of Classification Search
CPC ................................. B60J 5/0404; B60R 1/06
See application file for complete search history.

(56) References Cited

U.S. PATENT DOCUMENTS

| 3,114,530 | A | * | 12/1963 | Shilling | B60R 1/078 224/482 |
| 3,166,283 | A | * | 1/1965 | Farnsworth | B60R 1/078 224/561 |
| 3,228,643 | A | * | 1/1966 | Shilling | B60R 1/078 248/271 |
| 3,260,490 | A | * | 7/1966 | Trautner | B60R 1/078 248/480 |
| 2009/0134304 | A1 | * | 5/2009 | Rieder | B60R 1/06 248/475.1 |

(Continued)

FOREIGN PATENT DOCUMENTS

| DE | 19530941 A1 * | 2/1997 | ............ B60J 5/0404 |
| DE | 10 2006 040 987 | 3/2008 | |

(Continued)

OTHER PUBLICATIONS

German Search Report dated Jun. 2, 2017.
French Search Report dated Mar. 25, 2019.
Korean Examination Report dated Jul. 8, 2019.

*Primary Examiner* — Lori L Lyjak
(74) *Attorney, Agent, or Firm* — Gerald E. Hespos; Michael J. Porco; Matthew T. Hespos

(57) ABSTRACT

An exterior mirror (1) on a vehicle door (2) of a motor vehicle has a mirror foot (11) with a retaining portion (110) for securing the mirror foot (11) on the vehicle door (2). The vehicle door (2) has a door outer part (20), a door inner part (21) and a door well (23) between the outer and inner parts (20, 21). The door well (23) has a receiving opening (230) in the region of a door windowsill (22). The mirror foot (11) is angled to form the retaining portion (110) and the retaining portion (110) is inserted into the door well (23) through the receiving opening (230) and fixed within the door well (23).

6 Claims, 2 Drawing Sheets

(56) References Cited

U.S. PATENT DOCUMENTS

2010/0066122 A1    3/2010  Eckart
2011/0157734 A1    6/2011  Muller et al.
2016/0368419 A1*  12/2016  Toth ........................ B60R 1/06

FOREIGN PATENT DOCUMENTS

| DE | 10 2007 056 671 | | 5/2009 |
|---|---|---|---|
| DE | 10 2008 047 463 | | 4/2010 |
| DE | 10 2010 060 488 | | 6/2011 |
| DE | 102015105913 | A1 | 10/2016 |
| FR | 2 944 484 | | 10/2010 |
| FR | 2 954 737 | | 7/2011 |
| JP | 09-104292 | | 4/1997 |

* cited by examiner

ARRANGEMENT OF AN EXTERIOR MIRROR ON A VEHICLE DOOR OF A MOTOR VEHICLE

CROSS REFERENCE TO RELATED APPLICATION

This application claims priority under 35 USC 119 to German Patent Appl. No. 10 2016 121 141.9 filed on Nov. 7, 2016, the entire disclosure of which is incorporated herein by reference.

BACKGROUND

Field of the Invention

The invention relates to an arrangement of an exterior mirror on a vehicle door of a motor vehicle. The exterior mirror has a mirror foot with a retaining portion that secures the mirror foot on the vehicle door.

Description of the Related Art

The prior art includes various arrangements of an exterior mirror on a vehicle door of a motor vehicle. DE 10 2008 047 463 A1 discloses an arrangement where the mirror foot is passed through an aperture in the door outer part and mounted in such a way as to be supported on a reinforcing element arranged within the vehicle door and screwed to that element.

It is the object of the invention to provide an exterior mirror that can be secured on the vehicle door in an improved way.

SUMMARY

The invention relates to an arrangement for mounting an exterior mirror on a vehicle door of a motor vehicle. The vehicle door has a door outer part, a door inner part and a door well between the inner and outer parts. A receiving opening is formed in the region of a door windowsill. The mirror foot is angled to form the retaining portion. The retaining portion is inserted into the door well through the receiving opening and is fixed within the door well. More particularly, the retaining portion of the mirror foot is inserted into the door well from above through the receiving opening in the region of the door windowsill and is fixed therein in a suitable manner, rather than, as in the prior art, passing it through an aperture within the door outer part. Thus, there is no need to provide an aperture within the door outer part for the installation of the mirror foot.

A door well reinforcement may be arranged within the door well. The reinforcement may be spaced apart from the door inner part and may be designed to reinforce the door well in the region of the door outer part. The door well reinforcement contributes considerably to an increase in the mechanical stability of the vehicle door. The door well reinforcement may be hollow to reduce the weight of the vehicle door.

The retaining portion of the mirror foot may be secured on the door well reinforcement. The door well reinforcement has a high mechanical stability to enable the retaining portion of the mirror foot to be secured reliably thereon. In this context, it has proven expedient that the retaining portion of the mirror foot is screwed to the door well reinforcement by at least one fastening screw. A screwed joint of this kind can be produced in a very simple and low-cost way during the assembly of the arrangement.

A holding part may be arranged within the door well reinforcement, and the retaining portion of the mirror foot may be secured to the holding part. This fastening of the retaining portion of the mirror foot on the holding part can be provided as an alternative or in addition to the direct fastening of the retaining portion on the door well reinforcement. The additional holding part advantageously eliminates "shaking" of the exterior mirror that can occur while the motor vehicle is being driven. The retaining portion of the mirror foot can be screwed to the holding part by at least one fastening screw. This screwed joint can be produced in a very simple manner and with little effort during assembly.

The holding part can be a casting to achieve simple and low-cost production. The shape of the casting can be adapted in the desired way in a very simple manner by corresponding casting molds, thus enabling even relatively complex shapes to be obtained. As an alternative, the holding part can be embodied as a forging.

In another embodiment, the retaining portion of the mirror foot may be secured on the door inner part. The fastening of the retaining portion of the mirror foot on the door inner part can be implemented as an alternative or in addition to the direct fastening of the retaining portion on the door well reinforcement and/or the fastening of the retaining portion on the holding part provided within the door well reinforcement.

The retaining portion of the mirror foot can be screwed to the door inner part by at least one fastening screw. A screwed joint can be produced in a simple manner.

Further features and advantages of the invention will become clear from the following description of a preferred embodiment with reference to the attached figures.

DETAILED DESCRIPTION

Figure 1:
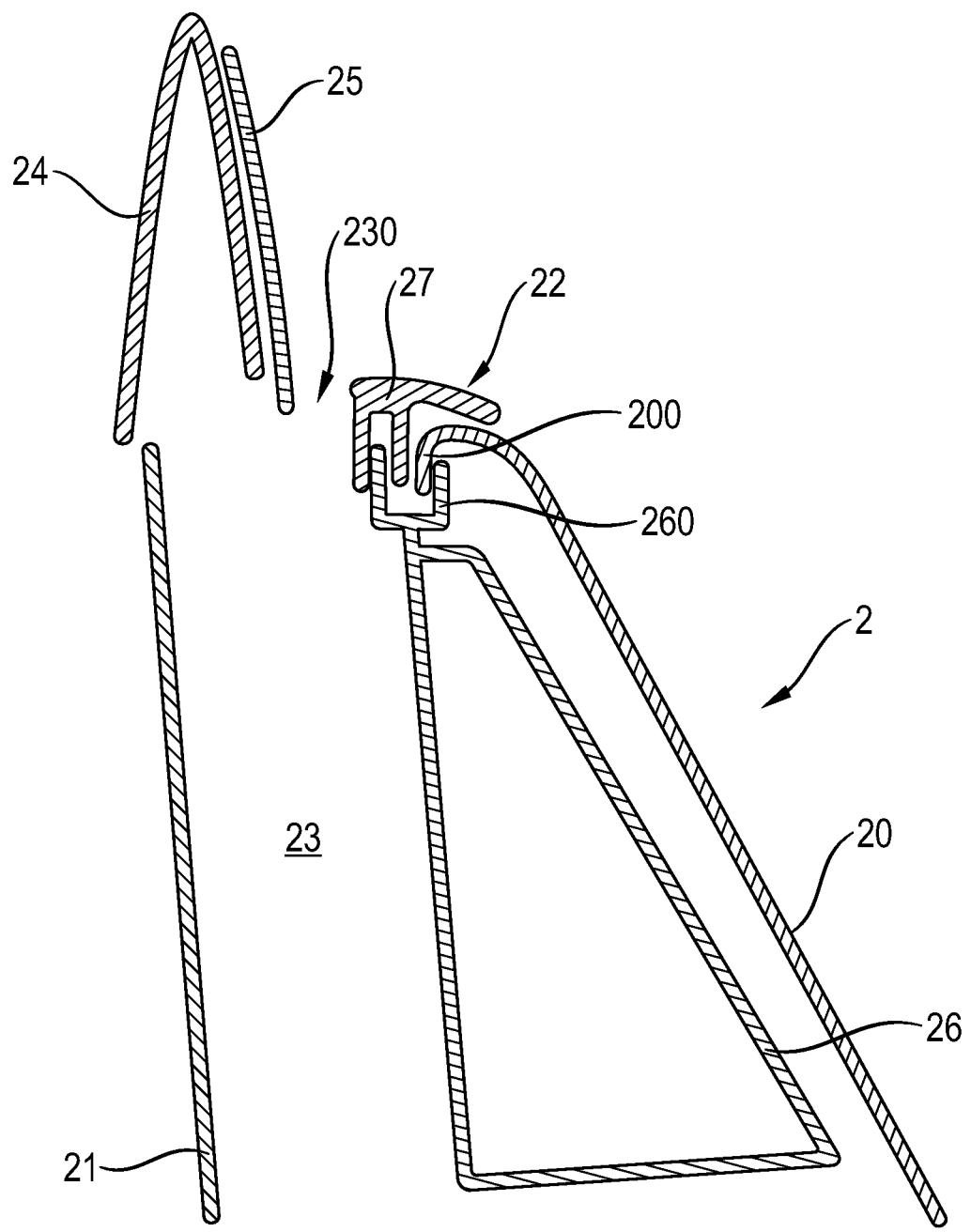
FIG. 1 shows a schematically greatly simplified vertical section through a vehicle door of a motor vehicle, and illustrates the installation space conditions for the installation of a mirror foot of an exterior mirror within a door well of the vehicle door.

As shown in FIG. 1, a vehicle door 2 of a motor vehicle has a door outer part 20 and a door inner part 21 that are spaced apart so that a cavity in the form of a door well 23 is formed between the door outer part 20 and the door inner part 21. A window guide 24 is arranged above the door inner part 21, and a window guide cover 25 is provided on an outer side of the window guide 24. A door well reinforcement 26 is arranged within the door well 23 at a position spaced apart from the door inner part 21 and is designed to reinforce the door well 23 in the region of the door outer part 20. The door well reinforcement 26 preferably is hollow to reduce the weight of the vehicle door 2.

An upper region of the door well reinforcement 26 has a receiving portion 260 of substantially U-shaped cross section, and an inward-bent free end 200 of the door outer part 20 engages in the receiving portion 260 in the region of a door windowsill 22. A door well sealing strip 27 is arranged above the door well reinforcement 26 and the free end 200 of the door outer part 20. The door well sealing strip 27 seals the door well 23 and decorates the door windowsill 22.

Figure 2:
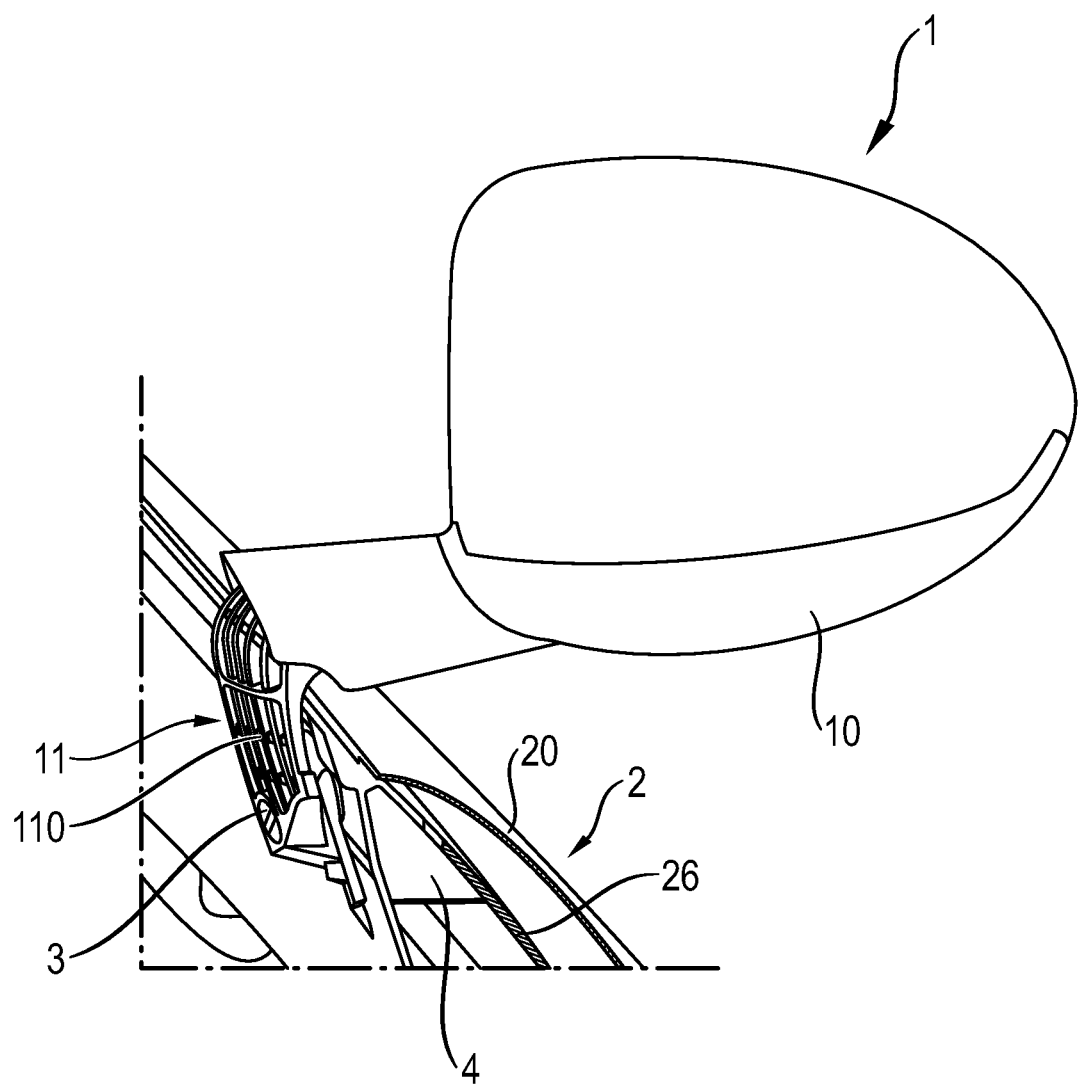
FIG. 2 shows a perspective, partially transparent view of an arrangement of an exterior mirror on a vehicle door according to a preferred illustrative embodiment.

With reference to FIG. 2, an exterior mirror 1 can be attached to the vehicle door 2, as shown in FIG. 2. The exterior mirror 1 has a mirror housing 10 and a mirror foot 11 that is attached to the mirror housing 10 or formed integrally with the mirror housing 10. The mirror foot 11 is angled and comprises a retaining portion 110 that is inserted into the door well 23 during assembly through an upper opening 230 in the door well 23 that is formed in the region of the door windowsill 22. The retaining portion 110 of the mirror foot 11 can be screwed directly to the door well reinforcement 26 by means of at least one fastening screw 3 to fix the mirror foot 11 within the door well 23. However, the mirror foot 11 also can be screwed to the door inner part 21.

In the embodiment shown in FIG. 2, a separate holding part 4 is attached within the hollow door well reinforcement 26 and receives the fastening screw 3 for fixing the retaining portion 110 of the mirror foot 11. The holding part 4 preferably is a casting and achieves secure retention of the retaining portion 110 while also preventing "shaking" of the exterior mirror 1 that can occur under some circumstances during driving the motor vehicle.

The arrangement of the exterior mirror 1 on the vehicle door 2 offers the advantage that the retaining portion 110 of the exterior mirror 1 is not passed from the outside through an aperture within the door outer part 20 during assembly. Rather, the retaining portion 110 is inserted from above into the door well 23 and fixed in the door well 23. It is thus advantageously unnecessary to provide the door outer part 20 with an aperture through which the retaining portion 110 of the exterior mirror 1 is passed during assembly.

What is claimed is:

1. An arrangement of an exterior mirror on a vehicle door of a motor vehicle, the exterior mirror having a mirror foot with a retaining portion for securing the mirror foot on the vehicle door, the vehicle door having a door outer part, a door inner part and a door well between the door outer part and the door inner part, a door well reinforcement arranged within the door well, the door well reinforcement being spaced apart from the door inner part and being configured to reinforce the door well in the region of the door outer part, the door well having a receiving opening in the region of a door windowsill, the mirror foot being angled to form the retaining portion and the retaining portion being inserted into the door well through the receiving opening and fixed within the door well.

2. The arrangement of claim 1, wherein retaining portion of the mirror foot is secured on the door well reinforcement.

3. The arrangement of claim 2, wherein the retaining portion of the mirror foot is screwed to the door well reinforcement by at least one fastening screw.

4. The arrangement of claim 2, further comprising a holding part arranged within the door well reinforcement, the retaining portion of the mirror foot being secured to the holding part.

5. The arrangement of claim 4, wherein the retaining portion of the mirror foot is screwed to the holding part by at least one fastening screw.

6. The arrangement of claim 4, wherein the holding part is a casting or a forging.

* * * * *